(12) United States Patent
Dai et al.

(10) Patent No.: US 12,472,091 B2
(45) Date of Patent: Nov. 18, 2025

(54) COMPOSITE POLYURETHANE CONDOM AND PREPARATION METHOD THEREOF

(71) Applicant: Reckitt Benckiser Health Limited, Slough (GB)

(72) Inventors: Jiabing Dai, Lanzhou (CN); Weihu Li, Lanzhou (CN); Linlin Feng, Lanzhou (CN); Liang Chen, Lanzhou (CN)

(73) Assignee: Reckitt Benckiser Health Limited (GB)

( * ) Notice: Subject to any disclaimer, the term of this patent is extended or adjusted under 35 U.S.C. 154(b) by 784 days.

(21) Appl. No.: 17/495,572

(22) Filed: Oct. 6, 2021

(65) Prior Publication Data

US 2023/0107662 A1    Apr. 6, 2023

(51) Int. Cl.
| | |
|---|---|
| A61F 6/04 | (2006.01) |
| B29C 41/42 | (2006.01) |
| C09J 175/06 | (2006.01) |
| C09J 175/08 | (2006.01) |

(52) U.S. Cl.
CPC .............. *A61F 6/04* (2013.01); *B29C 41/42* (2013.01); *C09J 175/06* (2013.01); *C09J 175/08* (2013.01); *C08G 2170/00* (2013.01)

(58) Field of Classification Search
CPC ....................................................... A61F 6/04
See application file for complete search history.

(56) References Cited

U.S. PATENT DOCUMENTS

| | | | | |
|---|---|---|---|---|
| 4,869,269 | A | * | 9/1989 | Sharkan ............... A61F 6/04 604/349 |
| 5,656,701 | A | * | 8/1997 | Miyamoto ........... C09J 175/04 524/591 |
| 2008/0194757 | A1 | * | 8/2008 | Fujita ................. C08G 18/348 524/538 |

FOREIGN PATENT DOCUMENTS

| | | | |
|---|---|---|---|
| CN | 102078233 A | * | 6/2011 |
| CN | 103692733 A | | 4/2014 |
| CN | 111072902 A | | 4/2020 |

OTHER PUBLICATIONS

Machine translation CN102078233.*
First Office Action dated Nov. 23, 2021, in CN Application No. 202010430483.4, filed May 20, 2020.
Second Office Action dated Jul. 27, 2022, in CN Application No. 202010430483.4, filed May 20, 2020.

* cited by examiner

*Primary Examiner* — Christopher T Schatz
(74) *Attorney, Agent, or Firm* — Lerner David LLP

(57) ABSTRACT

A composite polyurethane condom and a preparation method thereof. The composite polyurethane condom includes a first substrate layer, an adhesive layer formed on the first substrate layer, and a second substrate layer formed on the adhesive layer. A special adhesive layer is added between the two layers of materials, so that, for example, two materials with different polarities can be firmly attached together without delamination.

10 Claims, 2 Drawing Sheets

COMPOSITE POLYURETHANE CONDOM AND PREPARATION METHOD THEREOF

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

SEQUENCE LISTING

Not Applicable

STATEMENT REGARDING PRIOR DISCLOSURES BY THE INVENTOR OR A JOINT INVENTOR

Not Applicable

BACKGROUND OF THE DISCLOSURE

1. Field of the Invention

The invention belongs to the technical field of condoms, and specifically relates to a composite polyurethane condom and a preparation method thereof.

2. Description of Related Art

Due to the material characteristics of natural rubber latex, the thickness of natural rubber latex condoms is difficult to be less than 0.04 mm. At the same time, natural rubber latex contains a variety of proteins, and people with protein allergies may have certain safety risks. With the improvement of people's living standards, the demand for condoms of consumers is not only limited to the basic function of contraception, but more pursuit of condom use experience. Waterborne polyurethane condoms are new products on the market in recent years, but the flexibility of polyurethane materials has a certain gap compared with natural rubber. In order to integrate the characteristics of the two materials, a product that meets the needs of the public with thinness and flexibility is made. It adopts physical lamination method for production. Because natural rubber latex and waterborne polyurethane are two polar materials, the adhesion between the two materials is low during lamination, the product is prone to delamination and cannot meet the design requirements.

SUMMARY OF THE INVENTION

The present invention aims to provide a composite polyurethane condom and a preparation method thereof. For example, by adding a special adhesive layer between the two layers of materials, the two materials with different polarities can be firmly attached together without delamination.

In order to solve the above-mentioned problems, the present invention is achieved through the following technical solutions: a composite polyurethane condom comprises a first substrate layer, an adhesive layer formed on the first substrate layer, and a second substrate layer formed on the adhesive layer, wherein, the adhesive layer includes an aliphatic sulfonated waterborne polyurethane, the aliphatic sulfonated waterborne polyurethane contains amino groups, sulfonic groups and carboxyl groups in its molecular chain, wherein the aliphatic sulfonated waterborne polyurethane has a 100% modulus less than or equal to 1.2 N/mm$^2$, and wherein the adhesive layer has a thickness of 0.1-20 μm.

The first substrate layer can comprise a natural latex film, a synthetic rubber film, a polyurethane film, and/or a polyisoprene film. The second substrate layer can comprise a natural latex film, a synthetic rubber film, a polyurethane film and/or a polyisoprene film.

The adhesive layer can have an elongation at break greater than or equal to 500%.

The aliphatic sulfonated waterborne polyurethane can comprise a polyether/polyester polyol, an aliphatic isocyanate, a crosslinking agent, a small molecule chain extender and a hydrophilic chain extender.

The polyether/polyester polyol can have a molecular weight of 400-6000, and the polyether/polyester polyol can comprise polyoxypropylene glycol, polytetramethylene ether glycol, poly(neopentyl glycol adipate), poly 1,4-butanediol adipate, poly 1,6-hexanediol adipate, polycaprolactone and/or polycarbonate and/or combinations thereof.

The aliphatic isocyanate can comprise hexamethylene diisocyanate (HDI), isophorone diisocyanate (IPDI), dicyclohexylmethane-4,4'-diisocyanate (HMDI), other aliphatic isocyanates and/or a combination thereof.

The crosslinking agent can comprise trimethylolpropane, silanes, neopentyl glycol and/or castor oil and/or combinations thereof.

The hydrophilic chain extender can comprise sodium ethylenediaminoethanesulfonate and/or dihydroxymethyl propionic acid (DMPA) and/or combinations thereof.

In an exemplary embodiment, the adhesive layer has a number average molecular weight of 20,000-60,000 g/mol.

In an exemplary embodiment, the composite polyurethane condom further comprises a second adhesive layer formed on the second substrate layer and a third substrate layer formed on the second adhesive layer.

In an exemplary embodiment, the condom has a thickness of 0.01-0.068 mm.

In an exemplary embodiment, the number of layers of the condom is from 3-6.

In an exemplary embodiment, the aliphatic sulfonated waterborne polyurethane further comprises silyl (silane groups) and/or hydroxyl groups in its molecular chain.

In an exemplary embodiment, the present invention is a composite polyurethane condom comprising a first substrate layer, an adhesive layer formed on the first substrate layer, and a second substrate layer formed on the adhesive layer, wherein the adhesive layer comprises an aliphatic sulfonated waterborne polyurethane, the aliphatic sulfonated waterborne polyurethane comprising amino groups, sulfonic groups and carboxyl groups in its molecular chain.

The first substrate layer can comprise at least one of a natural latex film, a synthetic rubber film, a polyurethane film, and a polyisoprene film. The second substrate layer can comprise at least one of a natural latex film, a synthetic rubber film, a polyurethane film and a polyisoprene film.

The adhesive layer can have an elongation at break greater than or equal to 500%.

The aliphatic sulfonated waterborne polyurethane can comprise a polyether/polyester polyol, an aliphatic isocyanate, a crosslinking agent, a small molecule chain extender and a hydrophilic chain extender. The polyether/polyester polyol can have a molecular weight of 400-6000, and the polyether/polyester polyol can comprise polyoxypropylene glycol, polytetramethylene ether glycol, poly(neopentyl glycol adipate), poly 1,4-butanediol adipate, poly 1,6-hexanediol adipate, polycaprolactone, polycarbonate, and combinations thereof. The aliphatic isocyanate can comprises hexamethylene diisocyanate, isophorone diisocyanate, dicyclohexylmethane-4,4'-diisocyanate, and combinations thereof.

The crosslinking agent can comprise trimethylolpropane, silanes, neopentyl glycol, castor oil, and combinations thereof. The hydrophilic chain extender can be any one of sodium ethylenediaminoethanesulfonate, dihydromethyl propionic acid, and combinations thereof.

The aliphatic sulfonated waterborne polyurethane can have a 100% modulus less than or equal to 1.2 N/mm$^2$, and the adhesive layer can have a thickness of 0.1-20 μm. The aliphatic sulfonated waterborne polyurethane can comprise at least one of silyl and hydroxyl groups in its molecular chain.

The adhesive layer can have a number average molecular weight of 20,000-60,000 g/mol.

The composite polyurethane condom can further comprise a second adhesive layer formed on the second substrate layer and a third substrate layer formed on the second adhesive layer.

Another object of the present invention is to provide a method for preparing a composite polyurethane condom comprising providing a mold, forming a first substrate layer on the mold, forming an adhesive layer on the first substrate layer, forming a second substrate layer on the adhesion layer, and demolding to obtain the composite polyurethane condom, wherein the adhesive layer comprises an aliphatic sulfonated waterborne polyurethane, and wherein the aliphatic sulfonated waterborne polyurethane comprises amino groups, sulfonic groups and carboxyl groups in its molecular chain.

The step of demolding can comprise using mold release solution in water containing a release agent.

In an exemplary embodiment, the present invention is a method for preparing a composite polyurethane condom comprising providing a mold, forming a first substrate layer on the mold, forming an adhesive layer on the first substrate layer, forming a second substrate layer on the adhesion layer, and demolding to obtain the composite polyurethane condom, wherein the adhesive layer comprises aliphatic sulfonated waterborne polyurethane, wherein the aliphatic sulfonated waterborne polyurethane contains amino groups, sulfonic groups and carboxyl groups in its molecular chain, wherein the aliphatic sulfonated waterborne polyurethane has a 100% modulus less than or equal to 1.2 N/mm$^2$, and wherein the adhesive layer has a thickness of 0.1-20 μm.

In an exemplary embodiment, the mold is removed by using mold release solution in water containing a release agent.

In the present invention, by adding a special adhesive layer between the two layers of materials, the two materials with different polarities can be firmly attached together without delamination. In the present invention, the film materials on both sides of the adhesive layer are attached together, so that each film material can exert its own material advantages. The adhesive layer of the present invention has low modulus, high adhesiveness, high compatibility, high resilience and high adhesion. It combines materials with different properties through the boundary bridge effect, so that the condom of the present invention can be soaked in hot alkaline water or hot water at 50-70° C. for 1-10 minutes without delamination. In the present invention, for example, by the interaction between amino, sulfonic and carboxyl groups, it can react or form good adhesion with polyurethane or non-polar materials, so that the adhesive layer and the materials on both sides have strong adhesion, and further ensures that no delamination will occur.

These and other objects, features and advantages of the present invention will become more apparent upon reading the following specification in conjunction with the accompanying drawing figures.

BRIEF DESCRIPTION OF THE DRAWINGS

The accompanying Figures, which are incorporated in and constitute a part of this specification, illustrate several aspects described below.

SYMBOL DESCRIPTION

101 First substrate layer
102 Adhesive layer
103 Second substrate layer
104 Second adhesive layer
105 Third substrate layer

DETAIL DESCRIPTION OF THE INVENTION

The present invention will be further described through several specific embodiments below, but it should be noted that the specific material ratio, process conditions and results described in the embodiments of the present invention are only used to illustrate the present invention, and cannot be used to limit the protection scope of the present invention, and all equivalent changes or modifications made according to the spirit of the present invention should be included in the protection scope of the present invention. It should be noted that unless otherwise specified, the "%" described herein refers to "parts by mass".

In the present invention, it should be noted that if the terms "center", "up", "down", "left", "right", "vertical", "horizontal", "inner", "outer", etc. appear, the indicated orientation or position relationship is based on the orientation or position relationship shown in the figures, which is only for the convenience of describing the application and simplifying the description, rather than indicating or implying that the device or element referred to be required with a specific orientation, be constructed and operated in a specific orientation, and therefore cannot be construed as a limitation of the application. In addition, if the terms "first" and "second" appear, they are only used for descriptive and distinguishing purposes, and cannot be understood as indicating or implying relative importance.

The present invention provides a composite polyurethane condom and a preparation method thereof. By adding a special adhesive layer between the two layers of materials, for example, two materials with different polarities can be firmly attached together, so that the condom of the present invention can be soaked in hot alkaline water or hot water at 50-70° C. for 1-10 minutes without delamination.

Figure 2:
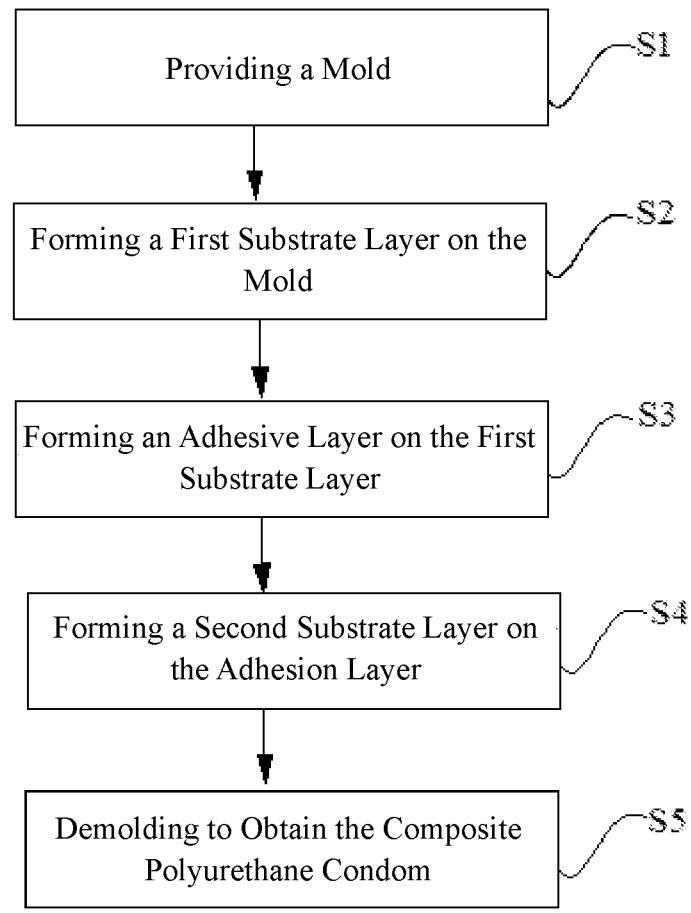
FIG. 2 is a schematic flow diagram of the method in an exemplary embodiment of the present invention.

As shown in FIG. 2, it is a schematic flow diagram of a method for preparing a composite polyurethane condom in an exemplary embodiment of the present invention, which includes at least the following steps:

S1. providing a mold;
S2. forming a first substrate layer on the mold;
S3. forming an adhesive layer on the first substrate layer;
S4. forming a second substrate layer on the adhesion layer; and
S5. demolding to obtain the composite polyurethane condom;

wherein the adhesive layer comprises aliphatic sulfonated waterborne polyurethane, wherein the aliphatic sulfonated waterborne polyurethane contains amino groups, sulfonic groups and carboxyl groups in its molecular chain, wherein the aliphatic sulfonated waterborne polyurethane has a 100% modulus less than or equal to 1.2 N/mm$^2$, and wherein the adhesive layer has a thickness of 0.1-20 μm.

Specifically, in step S1, for example, the mold is a condom mold of glass or other materials.

Specifically, in step S2, for example, the surface of the mold is heated to 30-40° C., and then the mold is immersed in an immersion liquid containing the material of the first substance layer 101, and for example, the immersion time is 35-60 seconds. After the immersion is completed, it is taken out. For example, it can be dried at 90-110° C., and it can be immersed repeatedly. The material of the first substrate layer 101 is, for example, any one of a natural latex film, a synthetic rubber film, a polyurethane film and a polyisoprene film.

Specifically, in step S3, the mold, on which the first substrate layer 101 is formed, is immersed in a liquid containing the material of adhesive layer 102, and for example, the immersion time is 35-60 seconds. After the immersion is completed, it is taken out. For example, it can be dried at 80-120° C., and it can be immersed repeatedly to form the adhesive layer 102. The material of the adhesive layer 102 includes, for example, aliphatic sulfonated waterborne polyurethane. Specifically, for example, the thickness of the adhesive layer 102 is 0.1-10 μm.

Specifically, in step S4, the mold, on which the adhesive layer 102 is formed, is immersed in a liquid containing the material of the second substrate layer 103, and for example, the immersion time is 35-60 seconds. After the immersion is completed, it is taken out. For example, it can be dried at 100-140° C., and it can be immersed repeatedly to form the second substrate layer 103. For example, the material of the first substrate layer 101 is any one of a natural latex film, a synthetic rubber film, a polyurethane film and a polyisoprene film. The materials of the first substrate layer 101 and the second substrate layer 103 have, for example, different polarities or the same polarities. The adhesive layer 102 of the present invention combines materials with different properties through a boundary bridge effect, so that, for example, two materials with different polarities can be firmly attached together.

Specifically, in step S5, for example, a hot alkaline water is used to swell the polyurethane condom, and the polyurethane condom is demolded by water flushing, for example, a release agent is added to the demolding water to remove the mold, and then the mold is dried by, for example, a dryer to obtain the composite polyurethane condom. The composite polyurethane condom is, for example, four-layer, five-layer, six-layer and other different layers. The adhesive layer 102 serves as one or two layers in the middle, and the two sides of each layer of the adhesive layers are respectively laminated with other material films.

Figure 1:
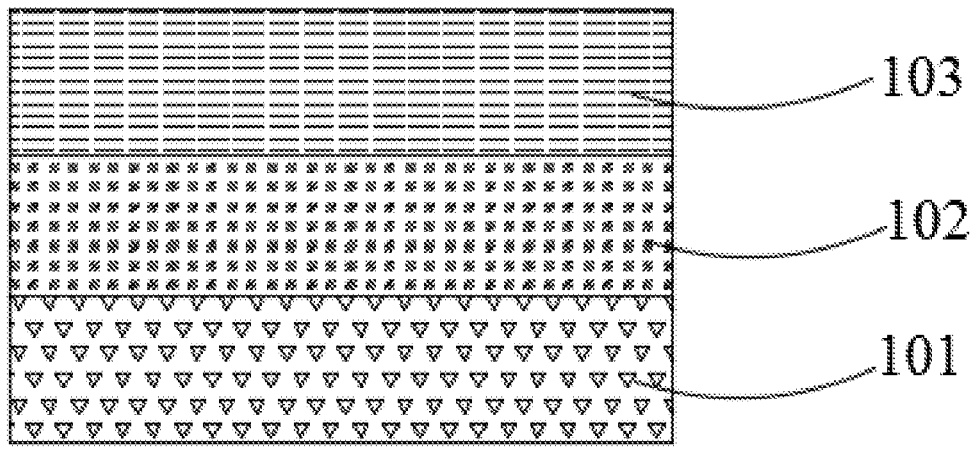
FIG. 1 is a schematic diagram of a composite polyurethane condom with a three-layer structure in an exemplary embodiment of the present invention.

As shown in FIG. 1, an exemplary embodiment of the present invention also provides a composite polyurethane condom with the thickness of 0.01-0.068 mm. The number of layers of the condom is, for example, from 3 to 6 layers. Specifically, it includes at least: a first substrate layer 101, an adhesive layer 102 and a second substrate layer 103. Among them, the adhesion layer 102 is formed on the first substrate layer 101. The second substrate layer 103 is formed on the adhesion layer 102. Among them, the adhesive layer 102 includes, for example, aliphatic sulfonated waterborne polyurethane. The molecular chain of the aliphatic sulfonated waterborne polyurethane contains unsaturated double bonds, amino groups, sulfonic acid groups and carboxyl groups, which can chemically interact with the first substrate layer 101 and the second substrate layer 103 to form, for example, a chemical bond. In another embodiment, the molecular chain of the aliphatic sulfonated waterborne polyurethane further includes, for example, silyl (silane groups) and/or hydroxyl groups. 100% modulus of the aliphatic sulfonated waterborne polyurethane is less than or equal to 1.2 N/mm$^2$, the thickness of the adhesive layer is 0.1-20 μm, and the elongation at break of the adhesive layer is, for example, greater than or equal to 500%. The first substrate layer 101 includes, for example, any one of a natural latex film, a synthetic rubber film, a polyurethane film, and a polyisoprene film. The second substrate layer 103 includes, for example, any one of a natural latex film, a synthetic rubber film, a polyurethane film, and a polyisoprene film. The polarities of the materials of the first base material layer 101 and the second base material layer 103 are, for example, different. The material of the adhesive layer 102 of the present invention is, for example, an aliphatic polyester waterborne polyurethane material, which is synthesized by polyester polyol, and has strong adhesion to polar and non-polar materials and has the characteristics of flexibility and high elongation. 100% modulus is less than or equal to 1.2 N/mm$^2$, and the elongation at break is greater than or equal to 500%. In an exemplary embodiment, the aliphatic sulfonated waterborne polyurethane includes polyether/polyester polyol, aliphatic isocyanate, crosslinking agent, small molecule chain extender and hydrophilic chain extender. In an exemplary embodiment, the molecular weight of the polyether/polyester polyol is 400-6000, and the polyether/polyester polyol includes any one or a combination of polyoxypropylene glycol, polytetramethylene ether glycol, poly(neopentyl glycol adipate), poly 1,4-butanediol adipate, poly 1,6-hexanediol adipate, polycaprolactone and polycarbonate. In an exemplary embodiment, the aliphatic isocyanate includes one or a combination of hexamethylene diisocyanate (HDI), isophorone diisocyanate (IPDI), dicyclohexylmethane-4,4'-diisocyanate (HMDI), and other aliphatic isocyanates. In an exemplary embodiment, the crosslinking agent includes any one or a combination of trimethylolpropane, silanes, neopentyl glycol, and castor oil. In an exemplary embodiment, the hydrophilic chain extender is any one or a combination of sodium ethylenediaminoethanesulfonate and dihydroxymethyl propionic acid (DMPA). For example, in the present invention, when natural rubber latex and waterborne polyurethane are laminated, adding an adhesive layer between the two layers is an effective method to overcome the defects of the prior art. For example, the number average molecular weight of the adhesion layer is 20,000-60,000 g/mol, which is beneficial to promote, for example, a strong adhesion between the first substrate layer 101 and the adhesion layer 102, as well as the second substrate layer 103 and the adhesive layer 102.

Figure 3:
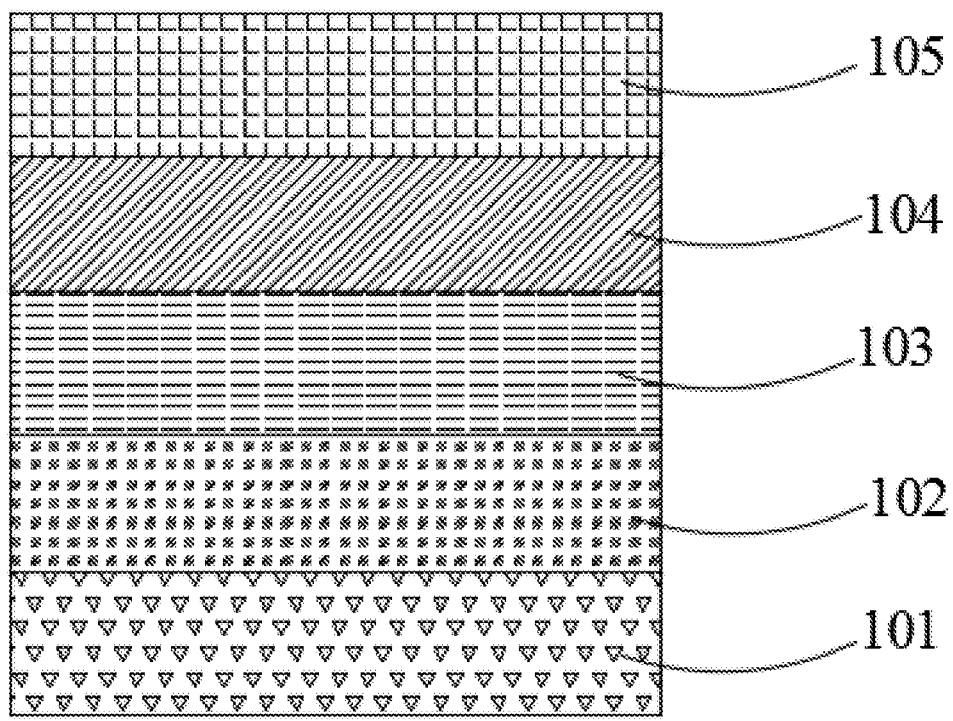
FIG. 3 is a schematic diagram of a composite polyurethane condom with a 5-layer structure in an exemplary embodiment of the present invention.

As shown in FIG. 3, in some embodiments, the composite polyurethane condom further includes, for example, a second adhesive layer 104 and a third substrate layer 105. Among them, the second adhesive layer 104 is formed on the second substrate layer 103, the third substrate layer 105 is formed on the second adhesive layer 102, and the polarities of the third substrate layer 105 and the second substrate layer 103 are, for example, the same or different. The third substrate layer 105 is, for example, any one of a natural latex film, a synthetic rubber film, a polyurethane film, and a polyisoprene film.

As shown in FIG. 1, in some embodiments, the first substrate layer 101 is, for example, a natural latex film or a synthetic rubber film, and the adhesive layer 102 is, for example, aliphatic sulfonated waterborne polyurethane containing unsaturated double bonds, amino groups and carboxyl groups in the molecular chain. 100% modulus of the aliphatic sulfonated waterborne polyurethane is less than or equal to 1.2 N/mm², and the thickness of the adhesive layer is 0.1-20 μm. The material of the second substrate layer 103 is, for example, a polyurethane film. In other embodiments, the first substrate layer 101 is, for example, a natural latex film or a synthetic rubber film, and the adhesion layer 102 is, for example, an aliphatic sulfonated waterborne polyurethane containing unsaturated double bonds, amino groups and carboxyl groups in the molecular chain. 100% modulus of the aliphatic sulfonated waterborne polyurethane is less than or equal to 1.2 N/mm², the thickness of the adhesive layer is 0.1-20 μm. The material of the second substrate layer 103 is, for example, a polyisoprene (PI) film. In still other embodiments, the first substrate layer 101 is a polyisoprene (PI) film, such as a water-based polyurethane film, and the adhesive layer 102 is, for example, a waterborne polyurethane film. The adhesion layer 102 is, for example, an aliphatic sulfonated waterborne polyurethane containing unsaturated double bonds, amino groups and carboxyl groups in the molecular chain. 100% modulus of the aliphatic sulfonated waterborne polyurethane is less than or equal to 1.2 N/mm², and the thickness of the adhesive layer is 0.1-20 μm. The material of the second substrate layer 103 is, for example, a polyisoprene (PI) film.

Some examples are listed below to specifically illustrate the present invention.

As referred to the data in TABLE 1, in an example, for example, the condom mold of glass or of other materials is cleaned. The surface of the mold is heated to 30-40° C., and then the mold is immersed in a latex liquid. For example, the latex liquid is a latex liquid containing natural rubber latex, synthetic rubber. For example, the immersion time is 35-60 seconds. After the immersion is completed, it is taken out and dried at, for example, 90-110° C., and it can be immersed repeatedly to form the latex layer A. Next, the mold on which the latex layer is formed is immersed in the liquid containing the material of the adhesive layer A. For example, the immersion time is 35-60 seconds. After the immersion is completed, it is taken out and dried at, for example, 80-120° C., and it can be immersed repeatedly to form the adhesive layer A. The material of the adhesive layer A includes, for example, aliphatic sulfonated waterborne polyurethane, specifically, for example, aliphatic polyester type waterborne polyurethane, and for example, the thickness of the adhesive layer A is controlled to be 0.1-10 km. Then, the mold on which the adhesive layer A is formed is immersed in a liquid containing waterborne polyurethane. For example, the immersion time is 35-60 seconds. After the immersion is completed, it is taken out and dried at, for example, 100-140° C., and it can be immersed repeatedly to form the waterborne polyurethane layer A. Crimping treatment is carried out. After crimping, it is dried at 120-140° C., swelled with hot alkaline water, demold with water flushing. Release agent is added in demolding water, and it is dried through a dryer to obtain the composite polyurethane condom A. In this example, one side is a latex material, and the other side is a waterborne polyurethane material, which are two materials with different polarities.

As referred to the data in TABLE 1, in another example, both sides of the adhesive layer B in this example are adhered with latex materials, which are materials with the same polarity. For example, the condom mold of glass or of other materials is cleaned, and the surface of the mold is heated to 30-40° C., and the mold is immersed in the latex liquid. For example, the latex liquid is a latex liquid containing natural rubber latex, synthetic rubber. For example, the immersion time is 35-60 seconds. After the immersion is completed, it is taken out and dried at, for example, 90-110° C., and it can be immersed repeatedly to form the latex layer B. Next, the mold on which the latex layer is formed is immersed in the liquid containing the material of the adhesive layer. For example, the immersion time is 35-60 seconds. After the immersion is completed, it is taken out and dried at, for example, 80-100° C., and it can be immersed repeatedly to form the adhesive layer B. The material of the adhesive layer B includes, for example, aliphatic sulfonated waterborne polyurethane, specifically, for example, aliphatic polyester type waterborne polyurethane, and for example, the thickness of the adhesive layer B is controlled to be 0.1-10 km. Then, the mold on which the adhesive layer B is formed is immersed in a liquid containing latex liquid B1. For example, the immersion time is 35-60 seconds. After the immersion is completed, it is taken out and dried at, for example, 90-110° C., and it can be immersed repeatedly to form the latex liquid B1. Crimping treatment is carried out. After crimping, it is dried at 100-120° C., swelled with hot alkaline water, demold with water flushing. Release agent is added in demolding water, and it is dried through a dryer to obtain the composite polyurethane condom B.

As referred to the data in TABLE 1, in another embodiment, both sides of the adhesive layer C in this embodiment are adhered with waterborne polyurethane materials, which are materials with the same polarity. For example, the condom mold of glass or of other materials is cleaned, and the surface of the mold is heated to 30-40° C., and the mold is immersed in the liquid C1 containing waterborne polyurethane. For example, the immersion time is 35-60 seconds. After the immersion is completed, it is taken out and dried at, for example, 90-110° C., and it can be immersed repeatedly to form the waterborne polyurethane layer C1. Next, the mold on which the waterborne polyurethane layer C1 is formed is immersed in the liquid containing the material of the adhesive layer C. For example, the immersion time is 35-60 seconds. After the immersion is completed, it is taken out and dried at, for example, 80-100° C., and it can be immersed repeatedly to form the adhesive layer C. The material of the adhesive layer C includes, for example, aliphatic sulfonated waterborne polyurethane, specifically, for example, aliphatic polyester type waterborne polyurethane, and for example, the thickness of the adhesive layer C is controlled to be 0.1-10 μm. Then, the mold on which the adhesive layer C is formed is immersed in a liquid C2 containing waterborne polyurethane. For example, the immersion time is 35-60 seconds. After the immersion is completed, it is taken out and dried at, for example, 100-

120° C., and it can be immersed repeatedly to form the waterborne polyurethane layer C2. Crimping treatment is carried out. After crimping, it is dried at 120-140° C., swelled with hot alkaline water, demold with water flushing. Release agent is added in demolding water, and it is dried through a dryer to obtain the composite polyurethane condom C.

As referred to the data in TABLE 1, in another example, one side of the adhesive layer C in this example is adhered with latex materials, and the other side is adhered with polyisoprene (PI), which are materials with different polarity. For example, the condom mold of glass or of other materials is cleaned, and the surface of the mold is heated to 30-40° C., and the mold is immersed in the latex liquid. For example, the latex liquid is a latex liquid containing natural rubber latex, synthetic rubber. For example, the immersion time is 35-60 seconds. After the immersion is completed, it is taken out and dried at, for example, 90-110° C., and it can be immersed repeatedly to form the latex layer D. Next, the mold on which the latex layer is formed is immersed in the liquid containing the material of the adhesive layer D. For example, the immersion time is 35-60 seconds. After the immersion is completed, it is taken out and dried at, for example, 80-120° C., and it can be immersed repeatedly to form the adhesive layer D. The material of the adhesive layer D includes, for example, aliphatic sulfonated waterborne polyurethane, specifically, for example, aliphatic polyester type waterborne polyurethane, and for example, the thickness of the adhesive layer D is controlled to be 0.1-10 µm. Then, the mold on which the adhesive layer D is formed is immersed in a liquid containing polyisoprene (PI). For example, the immersion time is 35-60 seconds. After the immersion is completed, it is taken out and dried at, for example, 100-140° C., and it can be immersed repeatedly to form the polyisoprene layer D. Crimping treatment is carried out. After crimping, it is dried at 120-140° C., swelled with hot alkaline water, demold with water flushing. Release agent is added in demolding water, and it is dried through a dryer to obtain the composite polyurethane condom D.

The composite polyurethane condoms obtained in the foregoing examples and comparative examples of the present invention were tested for related performance, and the test results are shown in TABLE 1.

It can be seen from the data in TABLE 1 and the examples that by adding a special adhesive layer between the two layers of materials, the two materials with different polarities can be firmly attached together, such that after the condom of the present invention is soaked in hot alkaline water or hot water at 50-70° C. for 1-10 minutes, there will be no delamination phenomenon. When materials with different polarities are adhered on both sides of the adhesive layer, the advantages of materials with different polarities can be maximized, so that the obtained composite polyurethane condom has low modulus, high adhesion, high compatibility, high resilience and high adhesion. For example, after soaking in hot alkaline water or hot water at 50-70° C. for 1-10 minutes without delamination, for example, the elongation at break can reach as high as 700%, 550%.

In summary, in the present invention, by adding a special adhesive layer between the two layers of materials, the two materials with different polarities can be firmly attached together without delamination. In the present invention, the film materials on both sides of the adhesive layer are attached together, so that each film material can exert its own material advantages. The adhesive layer of the present invention has low modulus, high adhesiveness, high compatibility, high resilience and high adhesion. It combines materials with different properties through the boundary bridge effect, so that the condom of the present invention can be soaked in hot alkaline water or hot water at 50-70° C. for 1-10 minutes, and there will be no delamination phenomenon. In the present invention, for example, by the interaction between unsaturated double bonds, amino groups, sulfonic acid groups, and carboxyl groups, it can react with, for example, polyurethane or vinyl, so that there is strong adhesion between the adhesive layer and the materials on both sides thereof, and further ensures that no delamination will occur.

The above descriptions are only preferred examples of the present invention, and are not intended to limit the present invention in any form or substantially. It should be pointed out that for those of ordinary skill in the art, without departing from the method of the present invention, several improvements and supplements can be made, and these improvements and supplements should also be regarded as the protection scope of the present invention. Anyone who is skilled in the art, without departing from the spirit and scope of the present invention, can make use of the technical content disclosed above to make minor changes, modifications and evolutionary equivalent changes, all of which are equivalent embodiments of the present invention; at the same time, any changes, modifications and evolutions made to the above-mentioned embodiments based on the essential technology of the present invention are still within the scope of the technical solutions of the present invention.

The invention claimed is:

TABLE 1

| | Performance Test | | | | |
| --- | --- | --- | --- | --- | --- |
| | | Composite polyurethane condom A | Composite polyurethane condom B | Composite polyurethane condom C | Composite polyurethane condom D |
| Physical properties | Thickness (mm) | 0.01 | 0.01 | 0.01 | 0.01 |
| | 100% modulus (N/mm²) | 0.5 | 1.2 | 0.7 | 0.5 |
| | Adhesion | Soaked in hot alkaline water or hot water at 50-70° C. for 1-10 minutes, no delamination | Soaked in hot alkaline water or hot water at 50-70° C. for 1-10 minutes, no delamination | Soaked in hot alkaline water or hot water at 50-70° C. for 1-10 minutes, no delamination | Soaked in hot alkaline water or hot water at 50-70° C for 1-10 minutes, no delamination |
| | Elongation at break (%) | 700 | 550 | 500 | 700 |

1. A composite polyurethane condom comprising:
a first substrate layer;
an adhesive layer formed on the first substrate layer; and
a second substrate layer formed on the adhesive layer;
wherein the adhesive layer comprises an aliphatic sulfonated waterborne polyurethane, the aliphatic sulfonated waterborne polyurethane comprising amino groups, sulfonic groups and carboxyl groups in its molecular chain;
wherein the aliphatic sulfonated waterborne polyurethane comprises a polyether/polyester polyol, an aliphatic diisocyanate, a crosslinking agent, and a hydrophilic chain extender;
wherein the aliphatic diisocyanate is selected from the group consisting of hexamethylene diisocyanate, isophorone diisocyanate, dicyclohexylmethane-4,4'-diisocyanate, and combinations thereof; and
wherein the adhesive layer has an elongation at break greater than or equal to 500%.

2. The composite polyurethane condom according to claim 1, wherein the second substrate layer comprises at least one of a natural latex film, a synthetic rubber film, a polyurethane film and a polyisoprene film.

3. The composite polyurethane condom according to claim 1, wherein the second substrate layer comprises at least one of natural latex film, a synthetic rubber film, a polyurethane film and a polyisoprene film.

4. The composite polyurethane condom according to claim 1, wherein the polyether/polyester polyol has a molecular weight of 400-6000, and the polyether/polyester polyol is selected from the group consisting of polyoxypropylene glycol, polytetramethylene ether glycol, poly(neopentyl glycol adipate), poly 1,4-butanediol adipate, poly 1,6-hexanediol adipate, polycaprolactone, polycarbonate, and combinations thereof.

5. The composite polyurethane condom according to claim 1, wherein the crosslinking agent is selected from the group consisting of trimethylolpropane, silances, neopentyl lglycol, castor oil, and combinations thereof.

6. The composite polyurethane condom according to claim 1, wherein the hydrophilic chain extender is selected from the group consisting of sodium ethylenediaminoethanesulfonate, dihydromethyl 1 propionic acid, and combinations thereof.

7. The composite polyurethane condom according to claim 1, wherein the aliphatic sulfonated waterborne polyurethane has a 100% modulus less than or equal to 1.2 $N/mm^2$, and the adhesive layer has a thickness of 0.1-20 μm.

8. The composite polyurethane condom according to claim 1, wherein the aliphatic sulfonated waterborne polyurethane comprises at least one of silyl and hydroxyl groups in its molecular chain.

9. The composite polyurethane condom according to claim 1, wherein the first substrate layer has a different polarity than the second substrate layer.

10. The composite polyurethane condom according to claim 1, wherein the first substrate layer has the same polarity as the second substrate layer.

* * * * *